United States Patent Office 2,789,912
Patented Apr. 23, 1957

2,789,912

DEACTIVATING CATALYTIC EFFECT OF METALS

William K. T. Gleim, Orland Park, Ill., assignor to Universal Oil Products Company, Des Plaines, Ill., a corporation of Delaware No Drawing. Application February 24, 1953,
Serial No. 338,565

17 Claims. (Cl. 99—163)

This application is a continuation-in-part of my copending application Serial Number 138,075, filed January 11, 1950, now abandoned, and relates to a novel method of deactivating the catalytic effect of a metal contained in an organic substance to catalyze oxidative deterioration of the organic substance.

The novel method of the present invention may be utilized for the treatment of organic substances containing metals which catalyze the oxidative deterioration thereof and thus may be utilized for the stabilization of hydrocarbon distillates including motor fuels and particularly unsaturated gasolines, including cracked gasoline, polymer gasoline, etc., kerosene, diesel oil, mineral oil, lubricating oil, fuel oil, drying oil, edible fats and oils, soya bean oil, foods, resins, rubber, greases, paraffin waxes, monomers including styrene, butadiene, isoprene, etc., acetylenes, alcohols, acids, ketones, and other substrates containing metals which catalyze oxidative deterioration thereof.

As applied to gasoline, one method of refining gasoline is the copper sweetening process, in which process the gasoline is contacted with a copper-sweetening reagent. As a result of this treatment, the sweetened gasoline usually contains relatively small amounts of copper compounds which have a catalytic effect on oxidation reactions occurring when the gasoline comes in contact with air. In addition, gasolines come in contact with various metals in the course of refining, storing and shipping operations, and this also may result in the gasoline containing minor amounts of such metals as iron, cobalt, nickel, chromium, lead, etc.

As applied to fatty materials including edible fats and oils these materials are prepared, stored and/or transported in equipment made of metal and thereby tend to undergo oxidative deterioration due to the catalytic effect of the metal. The edible fats and oils generally are of animal, vegetable or mineral origin. Typical representatives of these edible fats and oils include linseed oil, menhaden oil, cod liver oil, castor oil, olive oil, rapeseed oil, coconut oil, palm oil, corn oil, sesame oil, peanut oil, babassu oil, butter, fat, lard, beef tallow, etc., as well as the hydrogenated oils. It is understood that other oils and fats may be treated within the scope of the present invention, including oils and fats which have previously been subjected to various treatments, such as blowing with air, heat treatment, etc.

The compounds of the present invention which serve to deactivate the catalytic effect of metals are referred to as metal deactivators. These metal deactivators act on the metals present in the organic substance and, therefore, are effectively utilized in any substrate containing or contacting metals. The metal deactivators are distinguished from other additives generally added to organic substances for various purposes. For example in gasoline, a gum inhibitor is normally added to suppress gum formation. The metal deactivator does not substantially suppress gum formation in gasoline in the absence of metals, and on the other hand, the gum inhibitor does not suppress the catalytic effect of metals to any considerable extent.

An antioxidant is added in edible fats and oils in order to retard the development of rancidity therein. The metal deactivator will not substantially suppress rancidity development of edible fats and oils in the absence of metals, and the antioxidant will not suppress the catalytic effect of metals in the edible fats and oils to any considerable extent. Still another typical example is in the treatment of rubber in which an antioxidant and metal deactivator are both utilized in order to prevent undesirable deterioration of the rubber, which may result in brittleness, discoloration, decreased elasticity, etc. It is understood that these are set forth as typical examples of the various substrates to which the novel method of the present invention may be applied. The metal deactivator and other additive supplement each other in serving to stabilize organic substrates and prevent undesirable deterioration thereof.

In one embodiment the present invention relates to a method of deactivating the catalytic effect of a metal contained in an organic substance to catalyze deterioration of said organic substance, which comprises adding thereto a compound having the general structure:

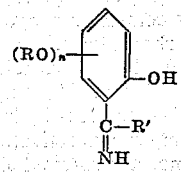

where R is selected from hydrogen and hydrocarbon groups, R' is a hydrocarbon group and $n$ is an integer.

In a specific embodiment the present invention relates to a method of deactivating the catalytic effect of a metal contained in an organic substance to catalyze deterioration of said organic substance, which comprises adding thereto a compound having the general structure:

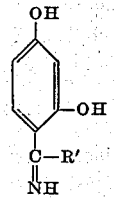

where R' is a hydrocarbon group.

In a more specific embodiment the present invention relates to a method of deactivating the catalytic effect of a metal contained in cracked gasoline to catalyze oxidative deterioration of said gasoline, which comprises adding thereto from about 0.0001% to about 0.1% by weight of 4-resorcinyl-methyl ketimine.

The preferred metal deactivator for use in the present invention is prepared by the reaction of resorcinol and acetonitrile. This reaction is readily effected in the presence of dry hydrogen chloride gas at 0° C. to form the corresponding ketimine hydrochloride, which is then converted to the desired ketimine compound by treatment with an alkali or alkaline earth bisulfite, phosphite, carbonate, etc. It is understood that this general method of manufacture may be utilized for the preparation of the other ketimine compounds and also that other suitable methods of preparation may be employed. For example, trichloroacetonitrile may be used in place of acetonitrile. Further, when desired, a catalyst such as zinc chloride or the like may be employed. It is understood that the aromatic hydroxy compound must contain at least 2 hydroxy groups when alkyl and aryl nitriles are used. Phenol may be used with trichloroacetonitrile, etc.; otherwise, ketimine formation is not obtainable with phenol but instead the imino ether is formed.

In a broad embodiment, any suitable polyhydroxy aromatic compound may be utilized in accordance with the present invention, including resorcinol, phloroglucinol, hydroquinone, hydroxyhydroquinone, catechol, pyrogallol, as well as suitable polyhydroxy naphthalenes, including 1,3-dihydroxynaphthalene, 1,4-dihydroxynaphthalene, etc. In place of acetonitrile, other suitable nitriles may be employed including propionitrile, butyronitrile, isobutyronitrile, valeronitrile, capronitrile, etc.

In the metal deactivator of the present invention it is essential that a hydroxy group is present in a position ortho to the ketimine group. In the preferred metal deactivators, a second hydroxy group is attached to the ring in a position meta to the first hydroxy group which in turn is ortho to the ketimine group. Thus, the preferred polyhydroxy aromatic compounds to be utilized in preparing the metal deactivator comprise resorcinol, pyrogallol, hydroxyhydroquinone and phloroglucinol, as well as similarly substituted polyhydroxy naphthalenes. It is also understood that, in place of one of the hydroxy groups, except the hydroxy positioned ortho to the ketimine group, an alkoxy group may be utilized as, for example, methoxy, ethoxy, propoxy, butoxy, etc. It is understood that the aromatic ring may contain other substituents and particularly hydrocarbon radicals such as methyl, ethyl, propyl, butyl, etc. Also, in the preferred metal deactivators, the R' radical preferably comprises a hydrocarbon group of from 1 to about 4 carbon atoms.

Referring to the general structure hereinbefore set forth, it will be noted that R and R' comprise hydrogen or hydrocarbon groups. When R is hydrogen, $n$ is 1 and R' is an alkyl substituent, the deactivator will comprise a catechyl-alkyl ketimine, a resorcinyl-alkyl ketimine or a hydroquinyl-alkyl ketimine. When R is hydrogen, $n$ is 2 and R' is an alkyl substituent, the deactivator will comprise a pyrogallyl-alkyl ketimine, a hydroxy-hydroquinyl-alkyl ketimine or a phloroglucinyl-alkyl ketimine. Specific compounds of these classes include 3-catechyl-methyl ketimine, 3-catechyl-ethyl ketimine, 3-catechyl-propyl ketimine, 3-catechyl-butyl ketimine, 3-catechyl-amyl ketimine, 3-catechyl-hexyl ketimine, 3-catechyl-heptyl ketimine, 3-catechyl-octyl ketimine, 3-catechyl-nonyl ketimine, 3-catechyl-decyl ketimine, 3-catechyl-undecyl ketimine, 3-catechyl-dodecyl ketimine, etc., 4-resorcinyl-methyl-ketimine, 4-resorcinyl-ethyl ketimine, 4-resorcinyl-propyl ketimine, 4-resorcinyl-butyl ketimine, 4-resorcinyl-amyl ketimine, 4-resorcinyl-hexyl ketimine, 4-resorcinyl-heptyl ketimine, 4-resorcinyl-octyl ketimine, 4-resorcinyl-nonyl ketimine, 4-resorcinyl-decyl ketimine, 4-resorcinyl-undecyl ketimine, 4-resorcinyl-dodecyl ketimine, etc., 2-hydroquinyl-methyl ketimine, 2-hydroquinyl-ethyl ketimine, 2-hydroquinyl-propyl ketimine, 2-hydroquinyl-butyl ketimine, 2-hydroquinyl-amyl ketimine, 2-hydroquinyl-hexyl ketimine, 2-hydroquinyl-heptyl ketimine, 2-hydroquinyl-octyl ketimine, 2-hydroquinyl-nonyl ketimine, 2-hydroquinyl-decyl ketimine, 2-hydroquinyl-undecyl ketimine, 2-hydroquinyl-dodecyl ketimine, etc., 4-pyrogallyl-methyl ketimine, 4-pyrogallyl-ethyl ketimine, 4-pyrogallyl-propyl ketimine, 4-pyrogallyl-butyl ketimine, 4-pyrogallyl-amyl ketimine, 4-pyrogallyl-hexyl ketimine, 4-pyrogallyl-heptyl ketimine, 4-pyrogallyl-octyl ketimine, 4-pyrogallyl-nonyl ketimine, 4-pyrogallyl-decyl ketimine, 4-pyrogallyl-undecyl ketimine, 4-pyrogallyl-dodecyl ketimine, etc., 2-(5-hydroxy-hydroquinyl)-methyl ketimine, 2-(5-hydroxy-hydroquinyl)-ethyl ketimine, 2-(5-hydroxy-hydroquinyl)-propyl ketimine, 2-(5-hydroxy-hydroquinyl)-butyl ketimine, etc., 2-(6-hydroxy-hydroquinyl)-methyl ketimine, 2-(6-hydroxy-hydroquinyl)-ethyl ketimine, 2-(6-hydroxy-hydroquinyl)-propyl ketimine, 2-(6-hydroxy-hydroquinyl)-butyl ketimine, etc., phloroglucinyl-methyl ketimine, phloroglucinyl-ethyl ketimine, phloroglucinyl-propyl ketimine, phloroglucinyl-butyl ketimine, phloroglucinyl-amyl ketimine, phloroglucinyl-hexyl ketimine, phloroglucinyl-heptyl ketimine, phloroglucinyl-octyl ketimine, phloroglucinyl-nonyl ketimine, phloroglucinyl-decyl ketimine, phloroglucinyl-undecyl ketimine, phloroglucinyl-dodecyl ketimine, etc.

As hereinbefore set forth the aromatic ring may contain other substituents. For example, when the benzene ring contain another benzene ring attached thereto the aromatic portion will be naphthyl and include such compounds as, for example, 4-(1,3-dihydroxy-naphthyl)-methyl ketimine, 4-(1,3-dihydroxy-naphthyl)-ethyl ketimine, 4 - (1,3 - dihydroxy - naphthyl) - propyl ketimine, 4 - (1,3 - dihydroxy - naphthyl) - butyl ketimine, 4 - (1,3-dihydroxy - naphthyl) - amyl ketimine, 4 - (1,3 - dihydroxy - naphthyl) - hexyl ketimine, 4 - (1,3 - dihydroxy-naphthyl) heptyl ketimine, 4 - (1,3 - dihydroxy - naphthyl) - octyl ketimine, 4 - (1,3 - dihydroxy - naphthyl)-nonyl ketimine, 4 - (1,3 - dihydroxy - naphthyl) - decyl ketimine, 4 - (1,3 - dihydroxy - naphthyl) - undecyl ketimine, 4 - (1,3 - dihydroxy - naphthyl) - dodecyl ketimine, etc., 3 - (2,4 - dihydroxy - naphthyl) - methyl ketimine, 3 - (2,4 - dihydroxy - naphthyl) - ethyl ketimine, 3 - (2,4-dihydroxy - naphthyl) - propyl ketimine, 3 - (2,4 - dihydroxy - naphthyl) - butyl ketimine, etc., 3 - (1,2 - dihydroxy - naphthyl) - methyl ketimine, 3 - (1,2 - dihydroxy-naphthyl) - ethyl ketimine, 3 - (1,2 - dihydroxy - naphthyl) - propyl ketimine, 3 - (1,2 - dihydroxy - naphthyl)-butyl ketimine, etc., 1,3,5 - trihydroxy - naphthyl - alkyl ketimines, 1,3,6 - trihydroxy - naphthyl - alkyl ketimines, 1,3,6 - trihydroxy - naphthyl - alkyl ketimines, etc., 2,4,5 - trihydroxy - naphthyl - alkyl ketimines, 2,4,6-trihydroxy - naphthyl - alkyl ketimines, etc.

When the aromatic ring contains an alkyl substituent attached thereto, specific compounds include 4-(6-methyl-resorcinyl)-methyl ketimine, 4-(6-ethyl-resorcinyl)-methyl ketimine, 4-(6-propyl-resorcinyl)-methyl ketimine, 4-(6-butyl-resorcinyl)-methyl ketimine, 4-(6-amyl-resorcinyl)-methyl ketimine, 4-(6-hexyl-resorcinyl)-methyl ketimine, etc., 4-(6-methyl-resorcinyl)-ethyl ketimine, 4-(6-ethyl-resorcinyl)-ethyl ketimine, 4-(6-propyl-resorcinyl)-ethyl ketimine, 4-(6-butyl-resorcinyl)-ethyl ketimine, 4-(6-amyl-resorcinyl)-ethyl ketimine, 4-(6-hexyl-resorcinyl)-ethyl ketimine, etc., 4-(6-methyl-resorcinyl)-propyl ketimine, 4-(6-ethyl-resorcinyl)-propyl ketimine, 4-(6-butyl-resorcinyl)-propyl ketimine, 4-(6-amyl-resorcinyl)-propyl ketimine, 4-(6-hexyl-resorcinyl)-propyl ketimine, etc., 4-(6-methyl-resorcinyl)-butyl ketimine, 4-(6-ethyl-resorcinyl)-butyl ketimine, 4-(6-propyl-resorcinyl)-butyl ketimine, 4-(6-butyl-resorcinyl)-butyl ketimine, 4-(6-amyl-resorcinyl)-butyl ketimine, 4-(6-hexyl-resorcinyl)-butyl ketimine, etc., similar resorcinol derivatives in which the alkyl group attached to the aromatic ring is substituted in the 2 or 5 positions, and compounds in which 2 or more alkyl groups are substituted in the 2, 5 and/or 6 positions. Substituted catechyl ketimines may contain 1 or more alkyl groups attached to the aromatic ring in the 4, 5 and/or 6 positions, and substituted hydroquinyl ketimines may contain one or more substituents in the 3, 5 and/or 6 positions. With the trihydroxy ketimine compounds, alkyl substituents may be positioned in the 5 and/or 6 positions of pyrogallyl ketimines, the 5 and/or 6 positions of the hydroxy-hydroquinyl ketimines and in the 4 and/or 6 positions of the phloroglucinyl ketimines.

When R in the above structure is a hydrocarbon group, the substituent will be alkoxy, phenoxy, cycloalkoxy, etc., and it may comprise a heterocyclic group. Specific compounds in this class include 4-(1-methoxy-3-hydroxy-phenyl)-methyl ketimine, 4-(1-ethoxy-3-hydroxy-phenyl)-methyl ketimine, 4-(1-propoxy-3-hydroxy-phenyl)-methyl ketimine, 4-(1-butoxy-3-hydroxy-phenyl)-methyl ketimine, 4-(1-pentoxy-3-hydroxy-phenyl)methyl ketimine, 4-(1-hexoxy-3-hydroxy-phenyl)-methyl ketimine, etc., and similar 4-(1-alkoxy-3-hydroxy-phenyl)-alkyl ketimines in which the last mentioned alkyl group comprises ethyl, propyl, butyl, amyl, hexyl, octyl, nonyl, decyl, undecyl, dodecyl, etc. Still other specific compounds include: 4-(2-methoxy-resorcinyl)-methyl ketimine, 4-(2-ethoxy-resorcinyl)-methyl ketimine, 4-(2-ethoxy-resorcinyl)-ethyl ketimine, 4-(2-propoxy-resorcinyl)-ethyl ketimine, 4-(2-propoxy-resorcinyl)-propyl ketimine, 4-(2-butoxy-resorcinyl)-propyl ketimine, 4-(2-butoxy-resorcinyl)-butyl ketimine, 4-(2-pentoxy-resorcinyl)-butyl ketimine, 4-(2-butoxy-resorcinyl)-amyl ketimine, 4-(2-pentoxy-resorcinol)-amyl ketimine, etc., 4-(2-phenoxy-resorcinyl)-methyl ketimine, 4-(2-phenoxy-resorcinyl)-ethyl ketimine, 4-(2-phenoxy-resorcinyl)-propyl ketimine, 4-(2-phenoxy-resorcinyl)-butyl ketimine, 4-(2-phenoxy-resorcinyl)-amyl ketimine, 4-(2-phenoxy-resorcinyl)-hexyl ketimine, etc., 4-(2-cyclohexoxy-resorcinyl)-methyl ketimine, 4-(2-cyclohexoxy-resorcinyl)-ethyl ketimine, 4-(2-cyclohexoxy-resorcinyl)-propyl ketimine, 4-(2-cyclohexoxy-resorcinyl)-butyl ketimine, 4-(2-cyclohexoxy-resorcinyl)-amyl ketimine, 4-(2-cyclohexoxy-resorcinyl)-hexyl ketimine, etc., and resorcinol derivatives containing one or more substituents in the 5 and/or 6 positions alone or in addition to a substituent in the 2 position and correspondingly substituted catechyl ketimines, hydroquinyl ketimines, pyrogallyl ketimines, hydroxyhydroquinyl ketimines and phloroglucinyl ketimines. Specific compounds containing a heterocyclic group include 5-(6-hydroxy-coumaranyl)-methyl ketimine, 5-(6-hydroxy-coumaranyl)-ethyl ketimine, 5-(6-hydroxy-coumaranyl)-propyl ketimine, 5-(6-hydroxy-coumaranyl)-butyl ketimine, 5-(6-hydroxy-coumaranyl)-amyl ketimine, 5-(6-hydroxy-coumaranyl)-hexyl ketimine, etc., 5-(4,6-dihydroxy-coumaranyl)-methyl ketimine, 5-(4,6-dihydroxy-coumaranyl)-ethyl ketimine, 5-(4,6-dihdroxy-coumaranyl)-propyl ketimine, 5-(4,6-dihydroxy-coumaranyl)-butyl ketimine, 5-(4,6-dihydroxy-coumaranyl)-amyl ketimine, 5-(4,6-dihydroxy-coumaranyl)-hexyl ketimine, etc., 6-(7-hydroxy-chromanyl)-methyl ketimine, 6-(7-hydroxy-chromanyl)-ethyl ketimine, 6-(7-hydroxy-chromanyl)-propyl ketimine, 6-(7-hydroxy-chromanyl)-butyl ketimine, 6-(7-hydroxy-chromanyl)-amyl ketimine, 6-(7-hydroxy-chromanyl)-hexyl ketimine, etc., 6-(5,7-dihydroxy-chromanyl)-methyl ketimine, 6-(5,7-dihydroxy-chromanyl)-ethyl ketimine, 6-(5,7-dihydroxy-chromanyl)-propyl ketimine, 6-(5,7-dihydroxy-chromanyl)-butyl ketimine, 6-(5,7-dihydroxy-chromanyl)-amyl ketimine, 6-(5,7-dihydroxy-chromanyl)-hexyl ketimine, etc.

R' in the above structure preferably is an alkyl group and specific compounds of this class are hereinbefore set forth. When R' is a phenyl group, specific compounds may comprise 4-resorcinyl-phenyl ketimine, 2-hydroquinyl-phenyl ketimine, 4-pyrogallyl-phenyl ketimine, 3-, 5- and/or 6-hydroxy-hydroquinyl-phenyl ketimines, phloroglucinyl-phenyl ketimines, etc. When R' is a cyclohexyl group specific compounds may comprise 4-resorcinyl-cyclohexyl ketimine, 2-hydroquinyl-cyclohexyl ketimine, 4-pyrogallyl-cyclohexyl ketimine, 2-(5-hydroxy-hydroquinyl)-cyclohexyl ketimine, phloroglucinyl-cyclohexyl ketimine, etc.

It is understood that numerous compounds may be prepared and utilized in accordance with the present invention but that these compounds will not necessarily be equivalent. For example, some compounds may be more effective in one substrate than in other substrates. However, all of these compounds will be effective in retarding oxidative deterioration catalyzed by metals present in the substrate.

In some cases it is preferred that the total number of carbon atoms in the metal deactivator should not exceed about 12. These compounds are of small molecular size and are very effective in very low concentrations. Therefore, they may be used in very small amounts in most substrates. In other cases larger molecular size compounds are desired for increased solubility in certain substrates. In one method, for example, R' may comprise a hydrocarbon group containing from 1 to about 20 carbon atoms.

As hereinbefore set forth the metal deactivator generally will be used in conjunction with other additives. The other additive will depend upon the particular substrate being stabilized. For example, in the stabilization of edible fats and oils, a preferred antioxidant comprises butylated hydroxyanisole. Other antioxidants include nordihydroguaiaretic acid (N. D. G. A.), gum guaiac, propyl gallate, lauryl thiodipropionate, various alkylated phenolic compounds including 2,6-ditertiary-butyl-4-methylphenol, 2,4-dimethyl-6-tertiary-butylphenol, etc. As applied to gasoline, satisfactory gum inhibitors include various phenols, amines, aminophenols, fractions of wood tar, etc. Some of these inhibitors are marketed in the form of a solution in a solvent such as alcohol, ether, etc. A particularly suitable gum inhibitor comprises a p-phenylene-diamine and more particularly N,N'-di-secondary-butyl-p-phenylene-diamine. Another particularly suitable gum inhibitor comprises a p-aminophenol and more particularly a mixture of a major proportion of N-n-butyl-p-aminophenol and a minor proportion of N,N'-di-n-butyl-p-phenylene-diamine in an alcoholic solvent. Still other suitable inhibitors comprise butylated hydroxyanisole and 2,2-dimethyl-6-tertiary-butyl-5-hydroxy-coumaran.

The antioxidant, gum inhibitor or other additive generally is utilized in concentrations of below about 1% by weight and preferably from about 0.001% to about 1% by weight. As hereinbefore set forth, the metal deactivator is utilized in small concentrations and thus may range from about 0.0001% to about 0.5% by weight of the substrate. The metal deactivator may be marketed as such or dissolved in a suitable solvent which is not reactive therewith. In some cases, when a solvent is used for the antioxidant, gum inhibitor, etc., the same solvent may be used for the metal deactivator and thus the 2 or more compounds, when desired, may be prepared as a mixture in a suitable solvent and the product marketed as a single commodity of a two-fold purpose.

The following examples are introduced to illustrate further the novelty and utility of the present invention but not with the intention of unduly limiting the same.

*Example I*

A metal deactivator was prepared by reacting an equal molecular mixture of resorcinol and acetonitrile with dry hydrogen chloride gas at 0° C. This resulted in the separation of a crystalline yellow precipitate of the ketimine hydrochloride which was then treated with sodium bisulfite to form 4-resorcinyl-methyl ketimine which has the following structure:

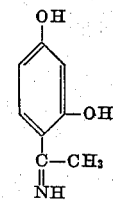

The 4-resorcinyl-methyl ketimine, prepared in the above manner, was utilized for the stabilization of a Pennsylvania cracked gasoline which had a blank induction period of 85 minutes. Upon the addition of 0.006% by weight of a gum inhibitor comprising N,N'-di-secondary-butyl-p-phenylene-diamine, the induction period was increased to 450 minutes. However, upon the addition of 0.5 mg. of copper per liter to another sample of the gasoline, the induction period fell to 190 minutes. 0.00032% by weight of the 4-resorcinyl-methyl ketimine was added to another sample of the gasoline containing the copper and gum inhibitor, and the induction period of the gasoline increased to 530 minutes. This shows that the use of this small amount of 4-resorcinyl-methyl ketimine offset the deleterious effect of the copper and produced a final gasoline of high stability.

Example II

In another series of tests, 1 ml. of copper per liter was added to another sample of the same gasoline, and the resultant product had an induction period of 20 minutes. Another sample containing both 1 mg. per liter of copper and 0.006% of gum inhibitor had an induction period of 125 minutes. Upon the addition of 0.00098% by weight of the 4-resorcinyl-methyl ketimine to another sample of the gasoline containing 1 mg. of copper and 0.006% of gum inhibitor, the induction period was increased to 455 minutes.

Example III

The lard used in this example had a normal stability period of 4 hours as determined by the Active Oxygen Method. This method is a standard test for determining stability of lard. In general, this test comprises bubbling air through a sample of the lard and periodically determining the peroxide number. The results are reported as the number of hours required to reach a peroxide number of 20.

In order to determine the effect of metal, a 3 inch strip of 18 gauge copper wire was added to a sample of the lard. The stability of the lard was reduced from 4 hours to 1 hour in the presence of copper. However, upon the addition of 0.02% by weight of 4-resorcinyl-methyl ketimine to another sample of the lard containing copper, the stability of the lard was increased to 4 hours. It thus will be noted that the metal deactivator compound of the present invention served to effectively offset the deleterious effect of the copper.

0.02% by weight of butylated hydroxyanisole was added to another sample of the lard and, in the absence of copper, the lard had a stability period of about 33 hours. However, upon the addition of copper to the lard containing butylated hydroxyanisole, the stability period dropped to 2 hours. From the above data it is noted that the butylated hydroxyanisole, while a very effective antioxidant in the absence of the copper, was of substantially no potency in the presence of the copper. Upon the addition of both butylated hydroxyanisole and 4-resorcinyl-methyl ketimine to the lard, the stability of the lard was increased to 22.5 hours.

Example IV

Phloroglucinyl-ethyl ketimine may be prepared by reacting phloroglucinol and propionitrile in the presence of dry hydrogen chloride gas and zinc chloride catalyst in the manner hereinbefore set forth for the preparation of the resorcinyl-methyl ketimine. 0.001% by weight of phloroglucinyl-ethyl ketimine may be incorporated in paraffin wax to retard oxidative deterioration caused by metal.

Example V

This example illustrates the use of the metal deactivator for the stabilization of rubber to prevent oxidative deterioration catalyzed by metals. 0.02% by weight of 4-resorcinyl-methyl ketimine may be added to the latex resulting from the emulsion polymerization of butadiene and styrene, after which the latex is coagulated and dried. This will serve to retard oxidative deterioration catalyzed by metals and the rubber, therefore, will be improved as to color, strength, elasticity, etc.

I claim as my invention:

1. An organic material containing a metal which normally catalyzes oxidative deterioration of said material and additionally containing a metal deactivating amount of a ketimine compound having the general structure:

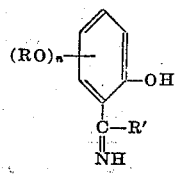

where R is selected from hydrogen and hydrocarbon groups, R' is an aliphatic hydrocarbon group of from 1 to about 20 carbon atoms and $n$ is an integer of from 1 to 2.

2. An organic material containing a metal which normally catalyzes oxidative deterioration of said material and additionally containing a metal deactivating amount of a ketimine compound having the general structure:

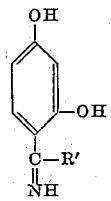

where R' is an aliphatic hydrocarbon group of from 1 to about 20 carbon atoms.

3. A composition as defined in claim 2 further characterized in that said hydrocarbon group is an alkyl radical of from 1 to about 4 carbon atoms.

4. Gasoline containing a metal compound which catalyzes oxidative deterioration and additionally containing a metal deactivating amount of a ketimine compound having the general structure:

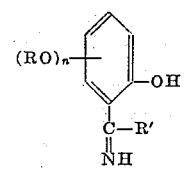

where R is selected from hydrogen and hydrocarbon groups, R' is an aliphatic hydrocarbon group of from 1 to about 20 carbon atoms and $n$ is an integer of from 1 to 2.

5. Gasoline containing a metal compound which catalyzes oxidative deterioration and additionally containing a metal deactivating amount of a ketimine compound having the general structure:

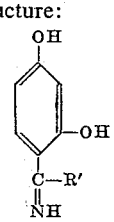

where R' is an aliphatic hydrocarbon group of from 1 to about 20 carbon atoms.

6. A composition as defined in claim 5 further characterized in that said hydrocarbbon group is an alkyl radical of from 1 to about 4 carbon atoms.

7. An organic material containing a metal which normally catalyzes oxidative deterioration of said material and additionally containing a metal deactivating amount of an aromatic ketimine having hydroxy groups in positions ortho and para with respect to the ketimine group and the carbon atom of the ketimine group having attached thereto an aliphatic hydrocarbon radical from 1 to about 20 carbon atoms.

8. Gasoline containing a metal which normally catalyzes oxidative deterioration of the gasoline and additionally containing a metal deactivating amount of 4-resorcinyl-methyl ketimine.

9. Cracked gasoline containing a metal which catalyzes oxidative deterioration of said gasoline and additionally containing from about 0.0001% to about 0.5% by weight of 4-resorcinyl-methyl ketimine.

10. Cracked gasoline containing a metal which catalyzes oxidative deterioration of said gasoline and additionally containing from about 0.001% to about 1% by weight of a gum inhibitor and from about 0.0001% to about 0.5% by weight of 4-resorcinyl-methyl ketimine.

11. Cracked gasoline containing a metal which catalyzes oxidative deterioration of said gasoline and additionally containing from about 0.001% to about 1% by weight of a p-phenylene diamine gum inhibitor and from about 0.0001% to about 0.5% by weight of 4-resorcinyl-methyl ketimine.

12. Cracked gasoline containing a metal which catalyzes oxidative deterioration of said gasoline and additionally containing from about 0.0001% to about 1% by weight of a p-aminophenol gum inhibitor and from about 0.0001% to about 0.5% by weight of 4-resorcinyl-methyl ketimine.

13. Lard containing a metal which catalyzes oxidative deterioration of said lard and additionally containing from about 0.0001% to about 0.5% by weight of 4-resorcinyl-methyl ketimine.

14. Lard containing a metal which catalyzes oxidative deterioration of the lard and additionally containing from about 0.001% to about 1% by weight of an antioxidant and from about 0.0001% to about 0.5% by weight of 4-resorcinyl-methyl ketimine.

15. Lard containing a metal which catalyzes oxidative deterioration of the lard and additionally containing from about 0.001% to about 1% by weight of butylated hydroxyanisole and from about 0.0001% to about 0.5% by weight of 4-resorcinyl-methyl ketimine.

16. Lard containing a metal which catalyzes oxidative deterioration of the lard and additionally containing from about 0.001% to about 1% by weight of 2,6-ditertiary-butyl-4-methylphenol and from about 0.0001% to about 0.5% by weight of 4-resorcinyl-methyl ketimine.

17. A composition as defined in claim 7 further characterized in that said hydrocarbon radical is an alkyl group of from 1 to about 4 carbon atoms.

References Cited in the file of this patent
UNITED STATES PATENTS

| | | |
|---|---|---|
| 2,346,662 | Chenicek | Apr. 18, 1944 |
| 2,686,723 | Chenicek | Aug. 17, 1954 |
| 2,700,682 | Blomberg | Jan. 25, 1955 |